United States Patent
Daoud

[19]

[11] Patent Number: 6,129,590
[45] Date of Patent: Oct. 10, 2000

[54] NETWORK INTERFACE DEVICE RETROFIT KIT

[75] Inventor: Bassel Hage Daoud, Parsippany, N.J.

[73] Assignee: Lucent Technologies, Inc., Murray Hill, N.J.

[21] Appl. No.: 09/107,410

[22] Filed: Jun. 30, 1998

[51] Int. Cl.[7] .................................................. H01R 24/00
[52] U.S. Cl. .......................................... 439/676; 379/399
[58] Field of Search ............................. 439/676; 379/399

[56] References Cited

U.S. PATENT DOCUMENTS

| | | | |
|---|---|---|---|
| 5,313,519 | 5/1994 | Mickelson et al. | 379/399 |
| 5,328,390 | 7/1994 | Johnston et al. | 439/676 |
| 5,416,837 | 5/1995 | Cote et al. | 379/399 |
| 5,671,273 | 9/1997 | Lanquist | 379/399 |

*Primary Examiner*—Michael L. Gellner
*Assistant Examiner*—Antoine Ngandjui
*Attorney, Agent, or Firm*—Birch, Stewart, Kolasch & Birch, LLP

[57] ABSTRACT

A network interface device is attachable to an intermediate field of a building entrance protector unit. The network interface device includes a jack section having a jack which is designed to receive the plug of a standard telephone. The jack includes wire leads which are connected to the telephone network terminals on the intermediate field. The jack section is mountable into a base module which is in turn attachable to the intermediate field by wedging a portion of the base module between adjacent terminals on the intermediate field. A plug section includes a plug having a pair of conductive blades therein which are connected to a pair of wire leads, which terminate in screw terminals for connection to the customer side equipment. The network interface device performs a connecting function when the plug is positioned within the jack, and an electrical connection is established between the wire leads connected to the telephone company network and the wire leads connected to the customer equipment. When there is a need to disconnect the customer from the telephone company network or to test the system, the plug can simply be removed from the jack, and a standard working telephone can be plugged into the jack for line testing purposes.

19 Claims, 6 Drawing Sheets

NETWORK INTERFACE DEVICE RETROFIT KIT

BACKGROUND OF THE INVENTION

1. Field of the Invention

The present invention relates to a connector for providing an electrical connecting between a telephone network and a customer, and more particularly, to a network interface device attachable to an intermediate field of a building entrance protector which additionally provides a convenient disconnect function so that the customer can be disconnected from the telephone network, and a standard telephone may be plugged into the network interface device for line testing purposes.

2. Description of the Background Art

Network interface units constitute the separation between the telephone company network and a customer's equipment. In buildings having multiple subscribers, the network interface unit may comprise a building entrance protector, which is typically installed in the basement of the building.

One example of such a building entrance protector is shown in FIGS. 8 and 9. The building entrance protector 100 includes a box 102 having a lid 104 pivotally attached thereto to form an enclosure. A cable 106 from the telephone company central office is fed to the interior of the box 102. The cable 106 includes multiple pairs of wires which are connected to protector modules arranged on a protector field 108. The connection is typically made using a wire wrap 110 on the underside of the protector field 108. The protector modules provide protection against electrical surges for the customer.

From the protector modules, the wire pairs are connected to selected terminals 112a on the underside of an intermediate field 112, commonly known as a 66-type block. A cable 114 from the customers is also fed to the interior of the box 102. The cable 114 may typically include twenty-five wire pairs entering into the box 102 through an RJ21 connector 116. Wire pairs from the customers are connected to selected other terminals 112b on the underside of the intermediate field 112.

In order to interconnect the network side terminals 112a to the customer side terminals 112b, it is known to use bridging clips 118 which are placed over adjacent terminals 112a, 112b on the upper side of the intermediate field 112, as shown in FIG. 10. A pair of bridging clips 118 are used to connect the pair of terminals 112a on the network side to the pair of terminals 112b of the customer, in order to establish an electrical connection. In order to disconnect the customer side equipment from the network side equipment, it is necessary to remove the bridging clips 118 from the terminals 112a, 112b.

Another method of connecting the network side terminals 112a to the customer side terminals 112b is to use jumper wires (not shown). However, unlike bridging clips 118 which are limited to use on adjacent terminals, jumper wires may be used to interconnect non-adjacent pairs of terminals.

At times, a problem with the telephone service of the customer will develop. It is useful for the customer to be able to plug a working telephone into a test jack in order to determine whether the problem exists in the lines of the telephone company or the lines of the customer. However, the method of interconnection using bridging clips does not provide a mechanism for allowing the customer to plug a working telephone into the network for testing purposes.

There is a need in the art for a network interface device which can quickly and easily connect the customer to the telephone network, while also providing a disconnect feature whereby the customer can be disconnected from the telephone network, and a standard telephone may be plugged into the network interface device for line testing purposes.

SUMMARY OF THE INVENTION

The present invention fulfills the aforementioned need in the art by providing a network interface device which is connectable to the terminals of an intermediate field, and which provides both a connecting and a disconnecting function. The network interface device includes a jack section having a jack which is designed to receive the plug of a standard telephone. The jack section is mountable into a base module which is in turn attachable to the intermediate field by wedging a portion of the base module between adjacent terminals on the intermediate field. The jack includes a pair of wires extending therefrom which are connected to the telephone company network terminals on the intermediate field using a special tool. The plug includes a pair of wires which are attached to a pair of screw terminals. The screw terminals may be connected to the customers telephone lines using a standard screwdriver.

When the plug is positioned within the jack, the pair of wires in the plug are electrically connected to the pair of wires in the jack, thereby establishing a connection between the telephone company network and the customer. When there is a need to test the system, the plug can simply be removed from the jack, and a working telephone can be plugged into the jack for testing purposes.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENTS

Figure 1:
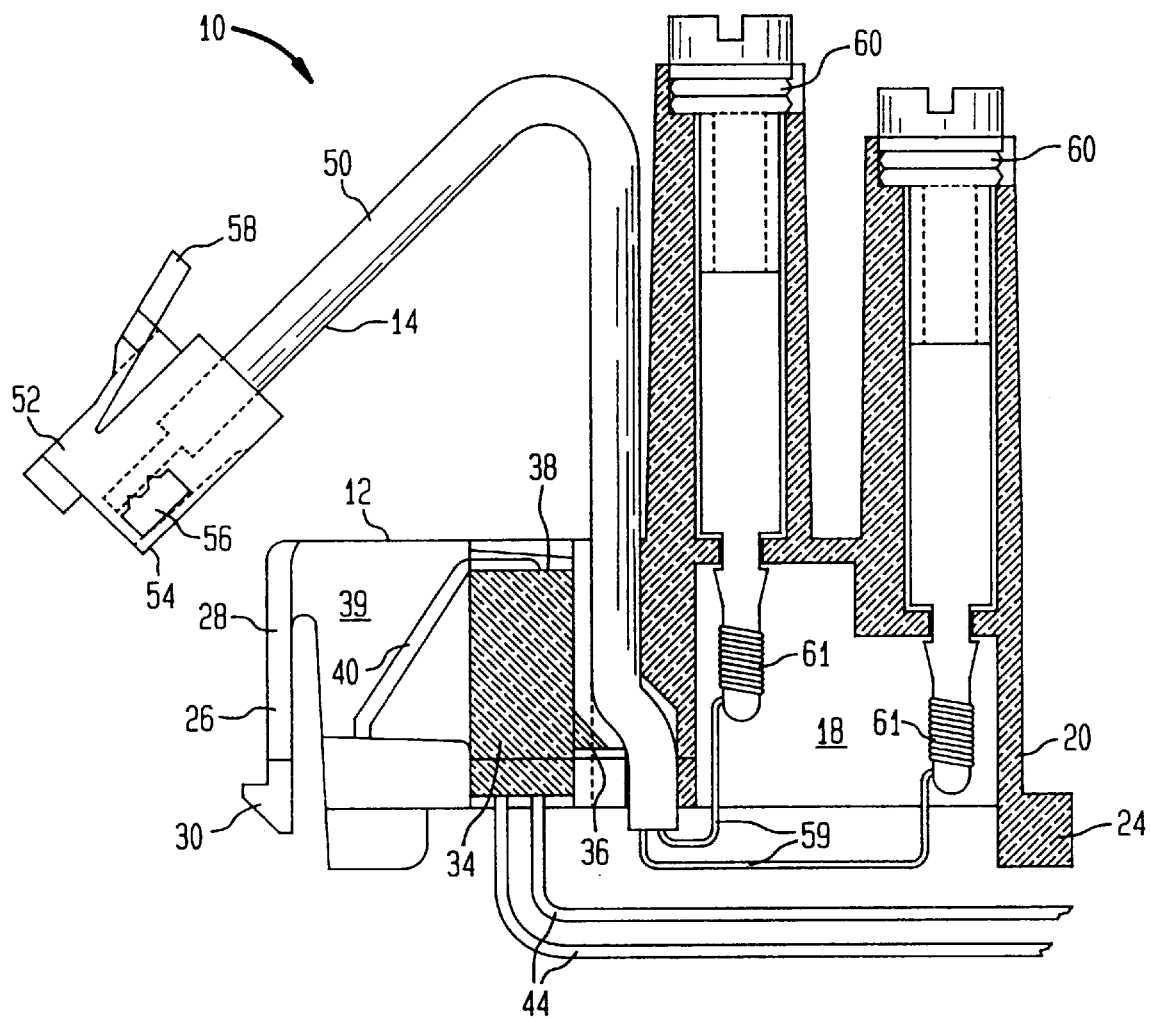
FIG. 1 is a side view of a network interface device according to the present invention in an open position.
Figure 2:
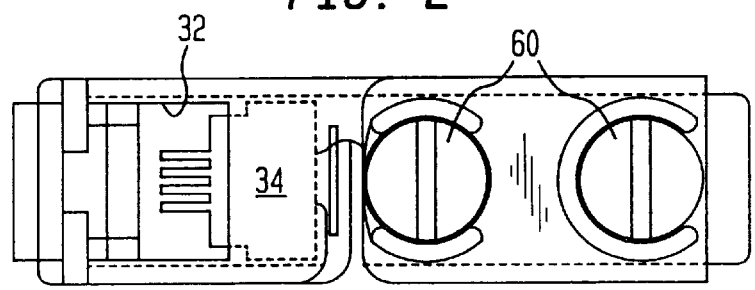
FIG. 2 is a top view of the network interface device of FIG. 1 showing the screw terminals and the upper portion of an insert with spring wires therein.
Figure 4:
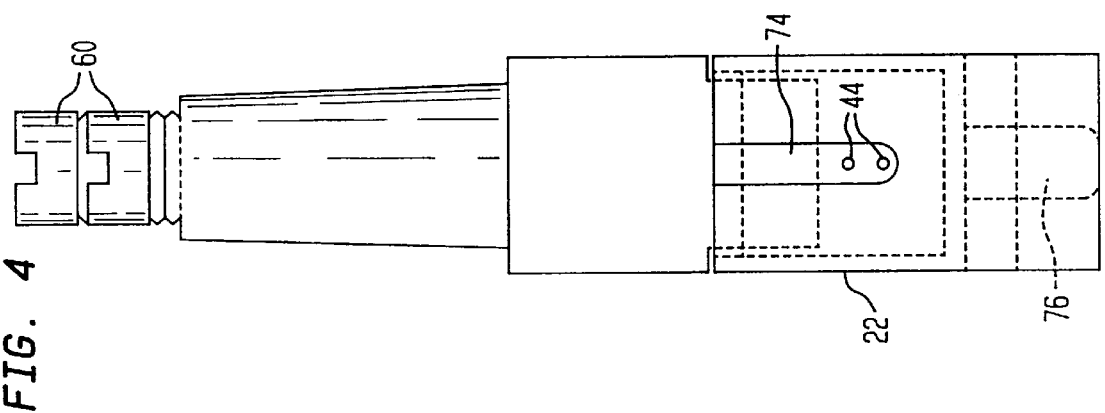
FIG. 4 is an end view of the network interface device and base of FIG. 3.
Figure 3:
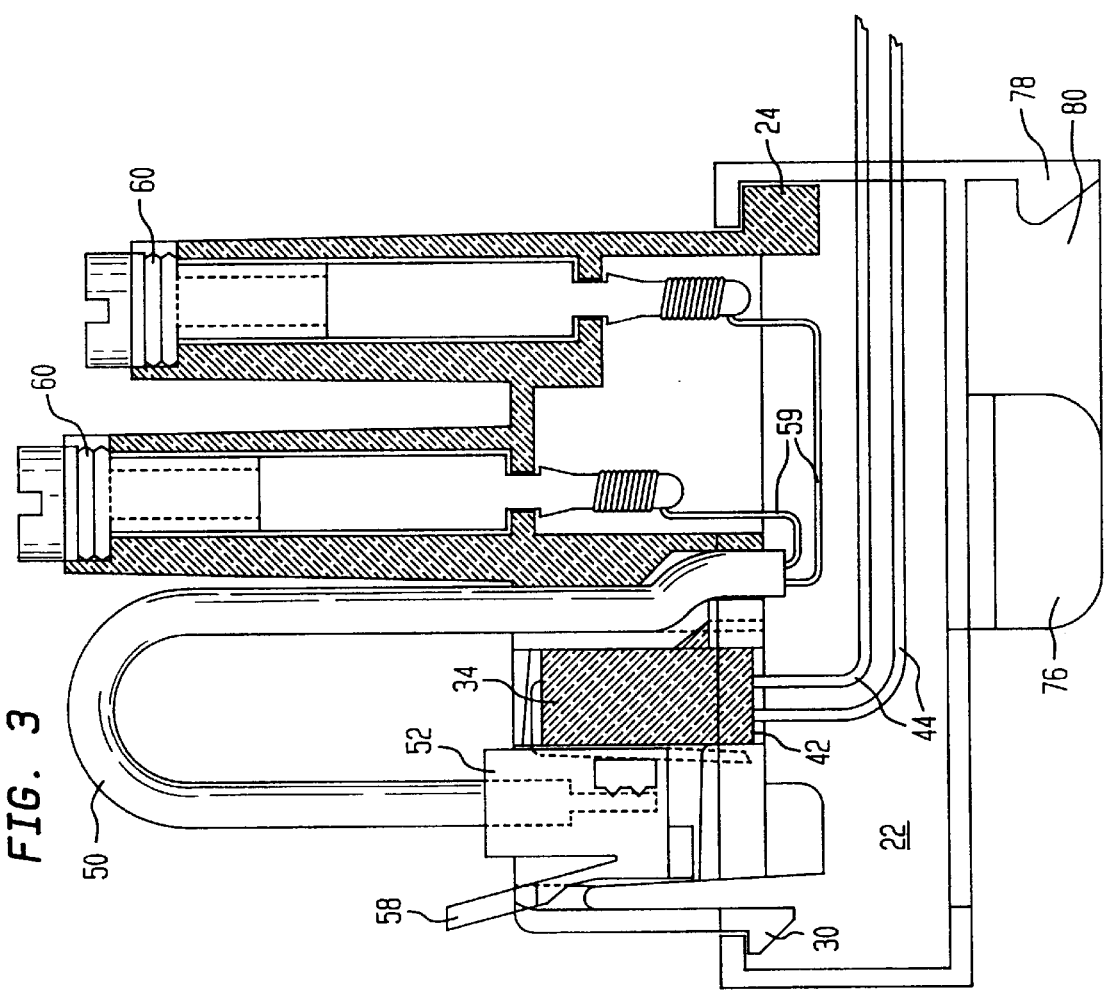
FIG. 3 is a side view of the network interface device in a closed position and installed on a base.
Figure 5:
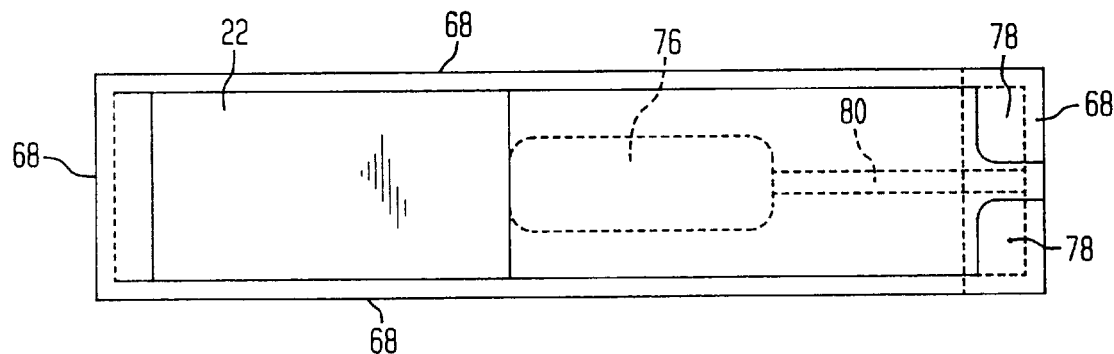
FIG. 5 is a top view of the base for receiving the network interface device.
Figure 6:
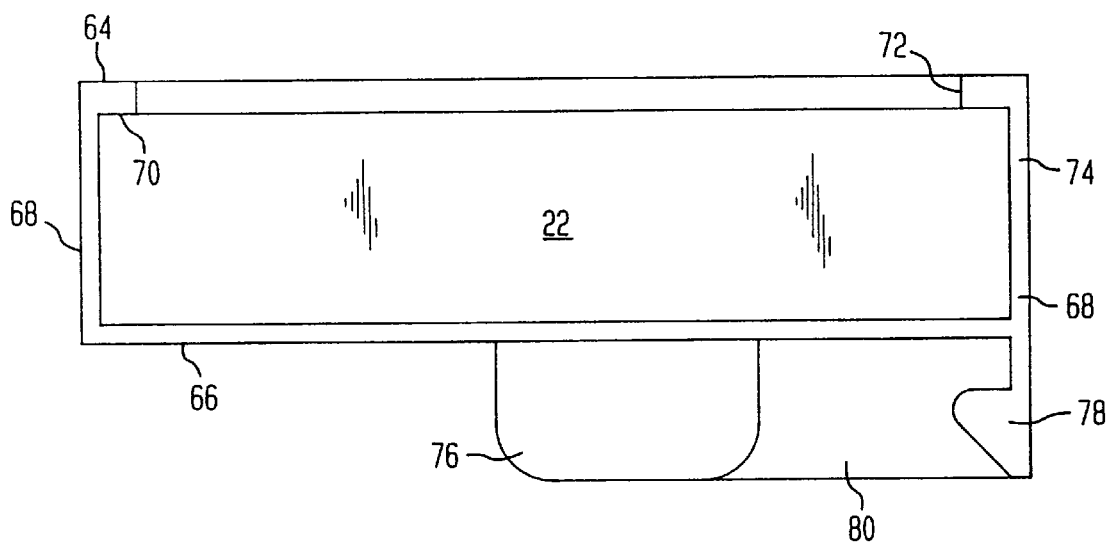
FIG. 6 is a side view of the base for receiving the network interface device.
Figure 7:
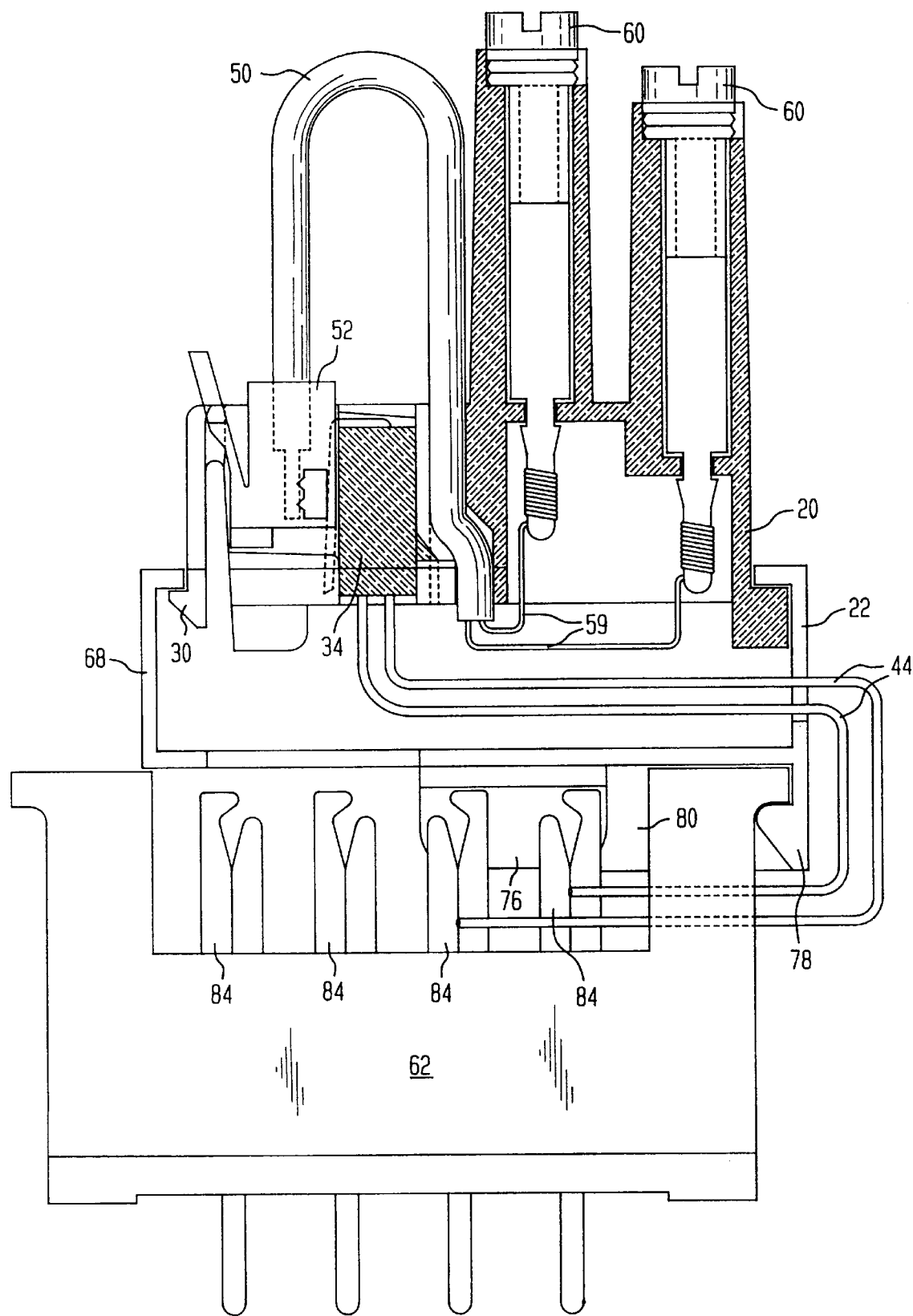
FIG. 7 is a side view showing the network interface device in the closed position installed on an intermediate field.
Figure 8:
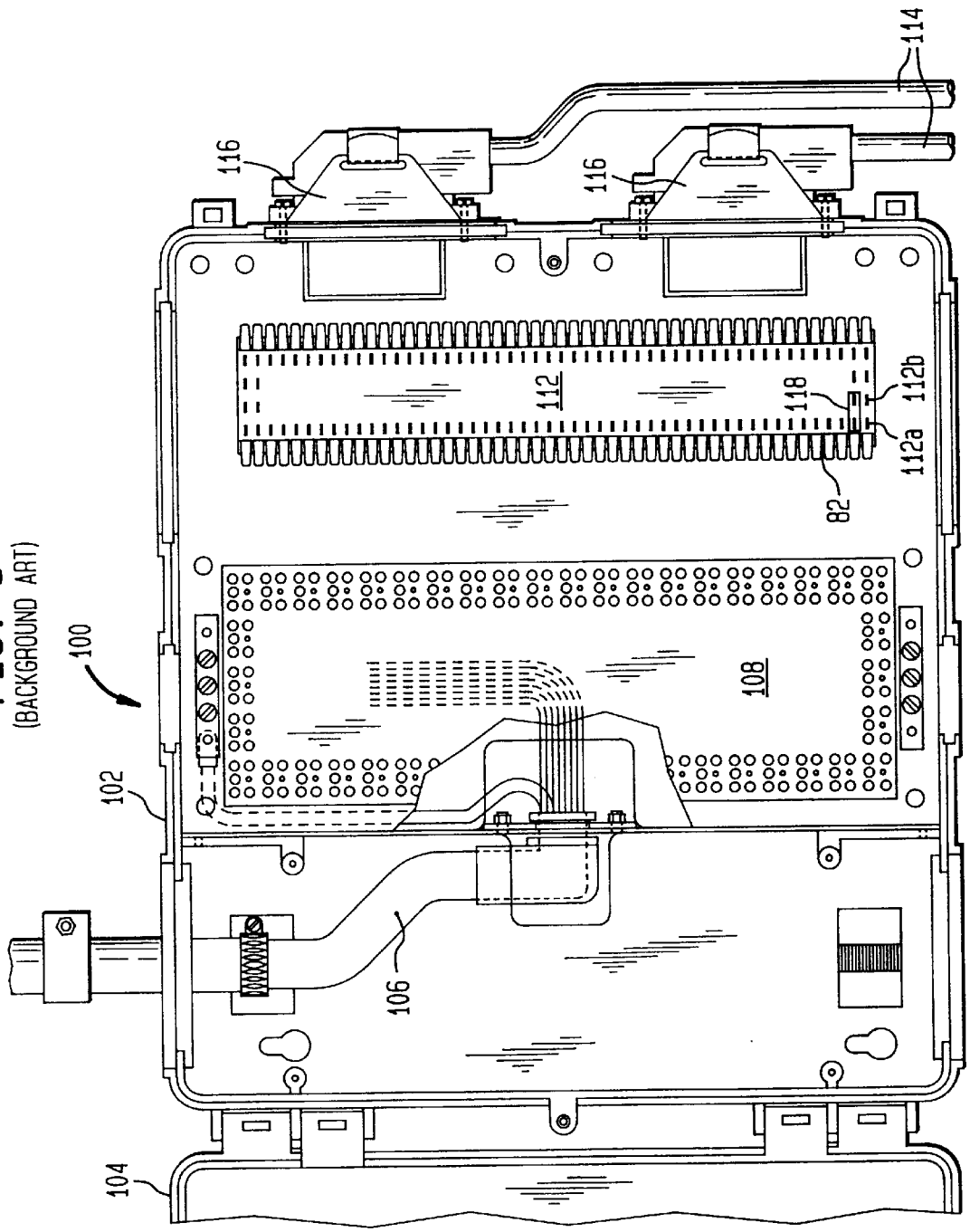
FIG. 8 is a plan view of a building entrance protector of the background art.
Figure 9:
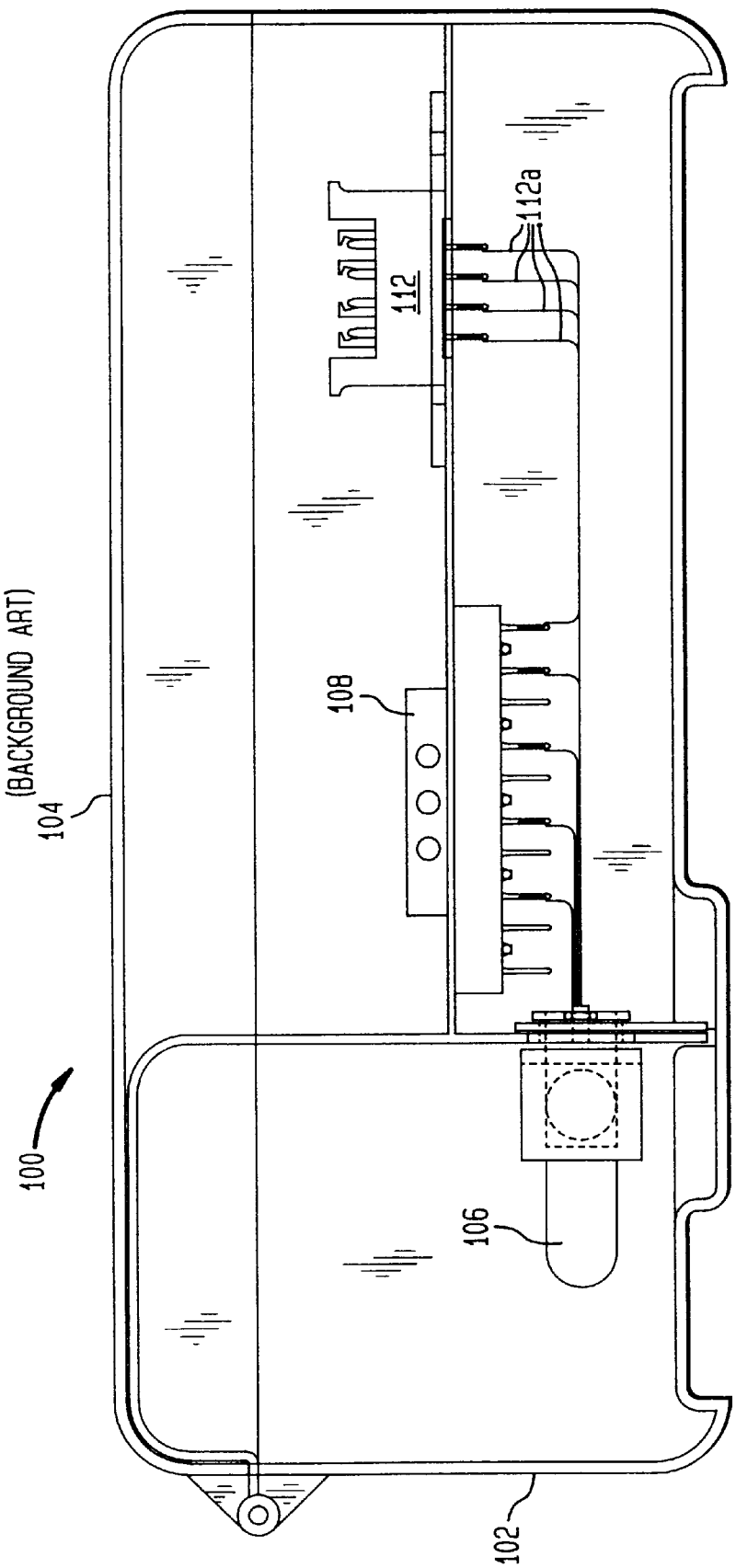
FIG. 9 is an end view of the building entrance protector of the background art

Referring in detail to the drawings, and with particular reference to FIG. 1, a network interface device 10 is shown. The network interface device 10 includes a jack section 12 and a plug section 14. The network interface device 10 has an essentially block-like main body portion 18. A lower portion of the main body portion 18 is formed as a rectangular base 20. The rectangular base 20 is receivable in a correspondingly shaped aperture in a base module 22 which will be described in detail later.

The rectangular base 20 includes a lip 24 extending laterally away from one side of the main body portion 18. A latch 26 is located on the side of the main body portion 18 opposite to the lip 24. The latch 26 includes a cantilevered arm 28 extending downwardly from the upper portion of the main body portion 18. The cantilevered arm 28 terminates in a hook 30 directed outwardly from the main body portion 18. The lip 24 and the latch 26 together form a mechanism for retaining the jack section 12 within the aperture of the base module 22.

The upper surface of the main body portion 18 includes an essentially rectangular aperture 32 therein which extends downwardly into the main body portion 18. An insert 34, commonly known as a 645-type insert, is located at one side of the aperture 32, and is held there by a hook 36. The insert 34 is preferably formed of a polymer material, such as polycarbonate or polypropylene. The aperture 32 having the insert 34 at one side thereof forms a jack 39 similar to a conventional telephone wall jack.

An upper end 38 of the insert 34 contains a pair of spring wires 40 extending therefrom. The spring wires 40 form contact points for the plug section 14 which will be described in detail later. A lower end 42 of the insert 34 includes a pair of wire leads 44 extending therefrom. The wire leads 44 are attached to the spring wires 40 by suitable connectors (not shown), such as solderless crimped connectors.

The plug section 14 includes a flexible jumper wire 50 having a plug 52 extending from a lower side 54 thereof A pair of conductive blades 56 are located within the plug 52. The conductive blades 56 may be formed of phosphorbronze or other conductive material. The plug section 14 is movable from a disconnected position where the plug 52 is out of and spaced from the jack 39, to a connected position where the plug 52 is received within the jack 39. A latch 58 is provided on the plug section 14 for latching the plug section 14 to the jack section 12 in the closed position. A pair of wire leads 59 are connected at one end to the pair of conductive blades 56. The other ends of the wire leads 59 are connected to a pair of screw terminals 60 using wire wraps 61.

When the plug 52 is not located in the jack 39, no interconnections are made between the wire leads 44 and the wire leads 59. Thus, the customer premises is disconnected from the central office of the telephone network side. At this time, a standard four pin RJ11 plug of a test telephone (not shown) may be plugged into the jack 39 for testing purposes. This arrangement allows simultaneous monitoring of the central office line and the customer line.

When the plug 52 is located within the jack 39, the conductive blades 56 located in the plug 52 make contact with pair of the spring wires 40 in the jack 39. In this orientation with the plug 56 in the connected position, an electrical connection is established between the customer side and the telephone network side.

A base module 22 is provided as means for securing the jack section 12 of the network interface device 10 to an intermediate field 62 of a building entrance protector, or BEP. The base module includes a top wall 64, a bottom wall 66, and a plurality of side walls 68. The top wall 64 includes an upper rim 70 which forms an aperture 72 through which the rectangular base 20 of the jack section 12 is inserted. The base module 22 is preferably formed of a polymer material, such as polycarbonate or polypropylene.

One of the side walls 68 includes a slot 74 through which the wire leads 44 may pass and exit the interior of the base module 22. The bottom wall 66 of the base module 22 includes a lug 76 extending downwardly therefrom near the center of the bottom wall 66, and a hook member 78 extending downwardly therefrom near one side of the bottom wall 66. A web 80 extends centrally along the base module 22 and between the hook member 78 and the lug 76.

Mounting of the jack section 12 in the aperture 72 is accomplished by first inserting the rectangular base 20 into the aperture 72 so that the wire leads 44 pass through the slot 74 and the lip 24 is beneath an underside of the upper rim 70 of the base module 22. The jack section 12 is then rotated until the hook 30 of the latch 26 snaps below and is secured under the other side of the upper rim 70 of the base module 22. The jack section 12 may thereafter be removed by pressing the cantilevered arm 28 of the latch 26 toward the main body portion 18 of the jack section 12 so that the hook 30 becomes disengaged from the undersurface of the upper rim 70 of the base module 22. The jack section 12 may then be rotated to disengage the lip 24, and then removed.

The wire leads 44 are connected to the terminals 84 of the intermediate field 62 in a known manner using a special tool. In the preferred embodiment, the wire leads 44 are connected to terminals 84 which are wired to the telephone network central office. The wire leads 44 are connectable to any of the terminals 84 of the intermediate field 62, and are not limited to adjacent pairs of terminals 84.

Mounting of the base module 22 to the intermediate field 62 is accomplished by first inserting the web 80 of the base module 22 into any slot 82 along a side of the intermediate field 62 and such that the hook member 78 is beneath an underside of the side edge of the intermediate field 62. The base member 22 is then rotated onto the intermediate field 62 until the lug 76 becomes frictionally wedged between adjacent ones of the terminals 84 on the intermediate field 62 so that the base module 22 is secure on the upper side of the intermediate field 62.

Alternatively, the base module 22 may simply be inserted directly onto the intermediate field 62 at any location as long as the lug 76 is wedged between adjacent terminals 84. Thus, the placement of the base module 22 is not limited by the particular location of the terminals 84 to which the wire leads 44 are connected.

It is conceived that the lip 24 and the latch 26 may be eliminated from the jack section 12, and that the lug 76, hook member 78 and web 80 could be integrally formed on the rectangular base 20 of the jack section 12 such that the base module 22 and the jack section 12 are an integral one-piece unit. It is also conceived that terminals other than the screw terminals 60 could be utilized, such as insulation displacement connectors.

The network interface device 10 of the present invention may be utilized on any of the terminals 84 on the intermediate field 62. However, it is desirable not to utilize this network interface device 10 on terminals 84 which are attached to special telephone lines, such as payphones and alarms, in order to avoid a situation where the alarm circuit is inadvertently disconnected. Instead, it is desirable to cover the terminals 84 of these devices with special caps (not shown) to prevent them from being disconnected and to prevent a network interface device 10 from being inadvertently connected onto them. The caps would preferably be made of a flexible vinyl material, and could be color-coded to identify the various special telephone lines.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A connector comprising:

a jack section including a jack having a first pair of wire leads extending therefrom;

a plug section including a plug having a flexible jumper wire extending therefrom, said jumper wire including a second pair of wire leads, said plug being insertable into said jack so that said first pair of wire leads are electrically connected to said second pair of wire leads; and a base module connectable to said jack section, said base module having a lug extending downwardly therefrom, said lug being insertable between adjacent terminals on an intermediate field to thereby retain the connector on the intermediate field.

2. The connector according to claim 1, wherein said jack section further comprises an insert located at least partially within said jack section, said insert including a pair of electrically conductive spring wires extending therefrom into said jack and connected to said first pair of wire leads.

3. The connector according to claim 1, wherein said base module includes a top wall, a bottom wall, and a plurality of side walls, one of said side walls having a slot therein for passage of said first pair of wire leads therethrough.

4. The connector according to claim 1, wherein said base module includes an aperture therein for receiving a lower portion of said jack section therein, said jack section includes a lip extending laterally away from one side of said jack section, and a latch located on an opposite side of said jack section, said lip and said latch retaining the jack section within said aperture of said base module.

5. The connector according to claim 1, wherein said base module further comprises a hook member and a web, said web being insertable into a slot located along a side of the intermediate field, with said hook member being positioned below a side lip of the intermediate field.

6. The connector according to claim 1, further comprising a pair of terminals connected to said second pair of wire leads.

7. The connector according to claim 6, wherein said terminals comprise screw terminals for attachment of a wire thereto.

8. A network interface device attachable to an intermediate field of a telephone network, said network interface device comprising:

a jack section including a jack having a first pair of wire leads extending therefrom a plug section including a plug having a flexible jumper wire extending therefrom, said jumper wire including a second pair of wire leads, said plug being insertable into said jack so that said first pair of wire leads are electrically connected to said second pair of wire leads; and a base module connectable to the intermediate field for securing the jack section to the intermediate field, said base module including a lug extending downwardly therefrom, said lug being wedgeable between adjacent terminals of the intermediate field to thereby frictionally retain said base module on the intermediate field.

9. The network interface device according to claim 8, further comprising an insert located within said jack section, said insert including a pair of electrically conductive spring wires extending therefrom and electrically isolated from one another.

10. The network interface device according to claim 8, wherein said pair of spring wires are connected to said first pair of wire leads, said first pair of wire leads being engagable with first and second terminals on said intermediate field.

11. The network interface device according to claim 8, wherein said base module includes an aperture therein for receiving a lower portion of said jack section therein.

12. The network interface device according to claim 8, wherein said base module further comprises a hook member and a web, said web being insertable into a slot located along a side of the intermediate field, with said hook member being positioned below a side lip of the intermediate field.

13. The network interface device according to claim 8, further comprising a pair of terminals connected to said second pair of wire leads.

14. The network interface device according to claim 13, wherein said terminals comprise screw terminals for attachment of a wire thereto.

15. A network interface device attachable to an intermediate field of a telephone network, said network interface device comprising:

a jack section including a jack having a first pair of wire leads extending therefrom a plug section including a plug having a flexible jumper wire extending therefrom, said jumper wire including a second pair of wire leads, said plug being insertable into said jack so that said first pair of wire leads are electrically connected to said second pair of wire leads; and means for securing the jack section to the intermediate field, said means for securing comprising a base module connectable to the intermediate field, said base module having an aperture therein for receiving a lower portion of said jack section therein, wherein said jack section includes a lip extending laterally away from one side of said jack section, and a latch located on an opposite side of said jack section, said lip and said latch retaining the jack section within said aperture of said base module.

16. A network interface device attachable to an intermediate field of a telephone network, said network interface device comprising:

a jack section including a jack having a first pair of wire leads extending therefrom a plug section including a plug having a flexible jumper wire extending therefrom, said jumper wire including a second pair of wire leads, said plug being insertable into said jack so that said first pair of wire leads are electrically connected to said second pair of wire leads; and means for securing the jack section to the intermediate field, wherein said means for securing comprises a hook member and a web, said web being insertable into a slot located along a side of the intermediate field, with said hook member being positioned below a side lip of the intermediate field.

17. A method of establishing an electrical connection between a pair of conductive terminals of an intermediate field and a pair of output terminals, said method comprising the following steps:

providing a connector having a jack and a plug insertable into said jack, said jack having a pair of electrically conductive spring wires extending therein, said spring wires having a first pair of wire leads attached thereto, said plug having a pair of electrically conductive blades therein, said conductive blades having a second pair of wire leads extending therefrom and connected to a pair of terminals;

providing a base attachable to said jack section, said base including a lug extending downwardly therefrom;

attaching one of said first pair of wire leads to said first terminal, and attaching another of said first pair of wire leads to said second terminal;

securing said base to said intermediate field by wedging said lug of said base between adjacent terminals on said intermediate field; and placing said plug into said jack such that the pair of conductive blades are connected to the pair of spring wires, thereby electrically connecting the first pair of wire leads to the second pair of wire leads.

18. The method according to claim 17, wherein said step of securing further comprises the steps of inserting a web of the base into a slot located along a side of the intermediate field, and positioning a hook member of the base below a side lip of the intermediate field.

19. The method according to claim 17, wherein said pair of conductive terminals are connected to a telephone network, and said pair of output terminals are connected to a telephone subscriber line.

* * * * *